US009502160B2

(12) United States Patent
Huang et al.

(10) Patent No.: US 9,502,160 B2
(45) Date of Patent: Nov. 22, 2016

(54) CORONA-FREE CAP ASSEMBLY

(71) Applicant: 3M INNOVATIVE PROPERTIES COMPANY, St. Paul, MN (US)

(72) Inventors: Zheng Huang, Shanghai (CN); Ming Zhang, Shanghai (CN); Jinquan Yang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 24 days.

(21) Appl. No.: 14/405,482

(22) PCT Filed: Jun. 5, 2013

(86) PCT No.: PCT/US2013/044199
§ 371 (c)(1),
(2) Date: Dec. 4, 2014

(87) PCT Pub. No.: WO2014/003999
PCT Pub. Date: Jan. 3, 2014

(65) Prior Publication Data
US 2015/0136444 A1 May 21, 2015

(30) Foreign Application Priority Data
Jun. 26, 2012 (CN) .......................... 2012 1 0214920

(51) Int. Cl.
*H01B 17/44* (2006.01)
*H02G 15/064* (2006.01)

(52) U.S. Cl.
CPC ............ *H01B 17/44* (2013.01); *H02G 15/064* (2013.01)

(58) Field of Classification Search
USPC ..................................... 174/140 H
See application file for complete search history.

(56) References Cited

U.S. PATENT DOCUMENTS 3,652,782 A 3/1972 Furusawa
4,046,958 A * 9/1977 Lusk ...................... H02G 15/06
174/73.1
(Continued)

FOREIGN PATENT DOCUMENTS

DE 922779 1/1955
EP 0050723 5/1982
(Continued)

OTHER PUBLICATIONS

International Search Report for PCT International Application No. PCT/US2013/044199, mailed on Aug. 27, 2013, 3pgs.
(Continued)

*Primary Examiner* — Dhirubhai R Patel
(74) *Attorney, Agent, or Firm* — Gregg H. Rosenblatt

(57) ABSTRACT

Disclosed is a corona-free cap assembly for achieving uniform electrical stress distribution around an electrical device having a cylindrical end, the corona-free cap assembly comprising: a clamping member configured for clamping on the cylindrical end along circumferential direction of the cylindrical end; and a corona-free cap comprising a grading chamber with two open ends, the corona-free cap further comprising a connection component fixed inside the grading chamber and adapted for connection with the clamping member in a manner that the corona-free cap is detachably fixed on the electrical device and the cylindrical end of the electrical device is at least partially extended into the grading chamber of the corona-free cap through one of the open ends.

11 Claims, 4 Drawing Sheets

(56) References Cited

U.S. PATENT DOCUMENTS

| | | | |
|---|---|---|---|
| 4,223,179 | A | 9/1980 | Lusk |
| 4,257,658 | A | 3/1981 | Hammond |
| 5,705,775 | A | 1/1998 | Ishihara |
| 7,671,274 | B2 | 3/2010 | An |

FOREIGN PATENT DOCUMENTS

| | | |
|---|---|---|
| JP | H08-294222 | 11/1996 |
| JP | 2003-235150 | 8/2003 |
| KR | 10-2007-0038070 | 4/2007 |
| WO | WO 2006/115538 | 11/2006 |

OTHER PUBLICATIONS

Supplementary European Search Report for EP Application No. EP 13808677, dated Jan. 1, 2016, 2pgs.

\* cited by examiner

CORONA-FREE CAP ASSEMBLY

FIELD OF THE INVENTION

The present invention relates to a corona-free cap device, particularly a corona-free cap assembly useful for transformer terminals.

BACKGROUND OF THE INVENTION

Along with rapid development of national economy, cities have experienced growing power shortages. Newly built substations with voltages of 110 kV or higher are constantly emerging in suburban areas, economic development zones, and downtown areas. Old-fashioned outdoor substations with bracket structures can no longer meet the requirements because of considerations in urban planning, environmental protection, land resource conservation, reduction of routine maintenance and other factors. On the other hand, electrical device assembly has been widely adopted due to its advantages of small occupied floor space and suitability for indoor arrangement.

In the power industry, GIS (Gas Insulated Switchgear, hereinafter referred to as GIS) refers to an enclosed sulfur hexafluoride insulated electrical device assembly, internationally known as "gas insulated metal enclosed switchgear". It combines all primary equipment except transformer in a substation, including circuit breaker, disconnecting switch, earthing switch, voltage transformer, current transformer, surge arrester, bus bar, cable terminal, incoming cable and outgoing cable bushings etc., into an integral assembly with an optimal design. GIS is also known as high voltage power distribution unit. Advantages of GIS lie in smaller occupied floor space, higher reliability, stronger safety, lower maintenance workload, and longer maintenance interval of major components of no less than 20 years.

Currently, production of GIS switchgear with voltages of 110 kV and higher has increased rapidly and has become a hot point. According to statistics provided by the National High Voltage Switch Association, production of 110 kV GIS in 2006 reached 3,664 bays, showing an increase of 993 bays from the previous year (2,671 bays) and an increase rate of 37.18%, and there were 15 GIS manufacturers, an increase of 4 from the previous year. The rapid development of 110 kV GIS is largely attributed to continuous modification and performance improvement on the products by manufacturers and a dramatic increase of demand from customers. Great progress has been made in the 110 kV GIS technology. Its structure has been improved from three phases in separate enclosures to three phases in one common enclosure. Its shell material has been evolved from steel plate to mostly aluminum alloys. Circuit break has been evolved from puffer type to self-extinguishing type. Disconnecting switch and earthing switch have been evolved to three-position combination type. Its operating mechanism has been evolved from hydraulic mechanism to light-duty spring operating mechanism; and some of secondary control systems have been evolved from conventional electro-magnetic type to intelligent electronic type. Some electric specifications have been enhanced from 126 kV/2000 A/31.5 kA to 145 kV/3150 A/40 kA. Technological advance has made 126 kV GIS smaller in size, lighter in weight, higher in reliability, and much lower in SF6 gas consumption. Therefore, it has gained a larger market share and has attracted more customers. GIS systems with voltages of 110 kV and higher have been widely used in large quantities and have been operated in some countries and regions for one or two decades. A lot of operation experiences have been gained. Manufacturers have been constantly improving GIS with voltages of 110 kV and higher based on production and operation experiences. Such improvement is mainly reflected in upgrade of specifications or renovation in structure to make the GIS even smaller in size and better in performance.

In the system, at the terminal of a transformer cable, a corona-free cap is usually used to improve electric field distribution around a conductive panel at the end of a transformer terminal and the transformer terminal, thus increasing their insulation level. A conventional corona-free cap is usually so designed that its connection interface (usually a hollow cavity) has the same size as the conductive panel on the epoxy insulator. Therefore, when a transformer terminal is electrically connected to transformer equipment, the first thing to do is to place the terminal for electrical connection on the conductive panel of the epoxy insulator so that it can contact directly with the conductive panel. Then, the connection interface of the corona-free cap is placed above the terminal and allowed to contact the terminal. Finally, the corona-free cap and the terminal are fixed on the conductive panel together with connecting bolts. However, a conventional corona-free cap must be placed above the terminal during installation. As a result, the corona-free cap must be removed before the terminal is connected with the corona-free cap during installation of the terminal. Therefore, installation of a conventional corona-free cap device is rather inconvenient. Moreover, if the terminal has already been connected with connecting wires before transformer equipment is shipped out of factory, an awkward situation would occur when the terminal is difficult to install since outer diameter of the joint with the terminal is larger than the bore size in the center of the corona-free cap.

SUMMARY OF THE INVENTION

The present invention is aimed at overcoming or alleviating at least one or more technical issues as described above in conventional technical solutions.

The present invention is aimed at providing a novel corona-free cap device for a transformer cable terminal.

Therefore, at least one objective of the present invention is to provide a corona-free cap assembly, which allows electrical connection with transformer terminal products to be readily achieved without dismantling the corona-free cap no matter how the terminal is connected.

According to one aspect of the present invention, there is provided a corona-free cap assembly for achieving uniform electrical stress distribution around the electrical device having a cylindrical end. The corona-free cap assembly comprises: a clamping member, which is configured for clamping the cylindrical end along the circumferential direction of the cylindrical end; and a corona-free cap, which comprises a grading chamber with two open ends. The corona-free cap further has a connection component fixed inside the grading chamber and connected with the clamping member in a manner that the corona-free cap is detachably fixed on the electrical device, and the cylindrical end of the electrical device is at least partially extended into the grading chamber of the corona-free cap through one of the open ends.

Particularly, a through opening is formed on the connection component, and the through opening is adapted for the cylindrical end of the electrical device to pass through the opening.

According to a preferred embodiment of the present invention, the connection component may have at least a substantially ring-shaped portion fixed on the inner surface of the grading chamber along the circumferential direction of the grading chamber.

According to another preferred embodiment of the present invention, the connection component may also have at least two circular arc parts fixed on the inner surface of the grading chamber along the circumferential direction of the grading chamber.

According to a preferred embodiment of the present invention, the clamping member may comprise a ring body and a clamp force adjusting mechanism. The clamp force adjusting mechanism is adapted for tightening/releasing the ring body clamped on the cylindrical end, and the clamp force adjusting mechanism comprises a gap and an adjusting means. The gap is provided on the ring body to form two ends, while the adjusting means is provided to change the gap size for adjusting the clamp force exerted by the clamping member on the cylindrical end. Furthermore the adjusting means comprises a threaded hole, a non-threaded hole, and a threaded fastener. The threaded hole is located at one end of the ring body, and the non-threaded hole is located at the other end of the ring body. The non-threaded hole and the threaded hole are designed to be coaxial, while the threaded fastener is designed to connect the non-threaded hole and the threaded hole.

According to another preferred embodiment of the present invention, the clamping member may also comprise a first and a second circular arc body and two adjusting means, in which each adjusting means is adapted to connect one end of the first circular arc body and one end of the second circular arc body together so that the clamping member is clamped on the cylindrical end. Furthermore each adjusting means comprises a threaded hole, a non-threaded hole, and a threaded fastener. The threaded hole is extended through one end of both the first and the second circular arc body, and the non-threaded hole is extended through another end of both the first and the second circular arc body, and the non-threaded hole and the threaded hole are designed to be coaxial, while the threaded fastener is provided to connect the non-threaded hole and the threaded hole so that corresponding ends of the first and the second circular arc body are connected together.

According to some embodiments of the present invention, the clamping member may also comprise one or more tension notches, and the one or more tension notches are formed on the clamping member and are adapted for releasing tension of the clamping member when the clamping member is clamped on the cylindrical end of the electrical device.

According to some embodiments of the present invention, the connection component may further comprise a plurality of first connection holes and a plurality of fasteners, and the plurality of the first connection holes are formed on the connection component and are adapted for aligning respectively with a plurality of the second connection holes formed on the clamping member; while the plurality of fasteners are provided to fasten the first connection holes and the corresponding second connection holes together.

Particularly, according to some embodiments of the present invention, in the aforementioned corona-free cap assembly, the electrical device may be an electrical cable partially covered by an insulator, while the cylindrical end is an armature head of the insulator, in which the armature head is adapted for electrically connecting the electrical cable with an external electrical device.

According to another aspect of the present invention, there is provided a cable terminal assembly. The cable terminal assembly comprises an electrical cable, an insulator having a cylindrical end, in which the insulator is adapted for covering at least a part of the electrical cable, and the aforementioned corona-free cap assembly, which is adapted for being detachably fixed on the insulator and for achieving uniform electrical stress distribution around the insulator.

It can be seen from the above that the present invention at least has the following technical effects: providing a novel corona-free cap assembly for a transformer cable terminal. The corona-free cap assembly mainly comprises a corona-free cap having a connection component (connection interface) and a clamping member. Particularly, a completely new connection manner is adopted for the corona-free cap assembly, namely, fixing the clamping member first on periphery of the cylindrical end (e.g., a conductive panel) of the electrical device (e.g., an insulator), and then fastening the connection component (the connection interface) and the clamping member together with a fastening mechanism, so that the corona-free cap is fixed on the clamping member. A bolt hole on the cylindrical end (e.g., a conductive panel) of the electrical device (e.g., an insulator) will be used to connect with the terminal. Therefore, the corona-free cap assembly provided by the present invention allows the corona-free cap to be fixed on periphery of the cylindrical end (e.g., a conductive panel) of the electrical device (e.g., an insulator) by using an independent clamping member. In this way, the bolt hole on the cylindrical end (e.g., a conductive panel) for connecting with the terminal will not be used when achieving connection of the corona-free cap with the cylindrical end (e.g., a conductive panel) of the electrical device (e.g., an insulator). Thus, the electrical connection with transformer terminal products can be readily achieved without dismantling the corona-free cap.

BRIEF DESCRIPTION OF THE DRAWINGS

In order for the above and other aspects and advantages of the present invention to become more apparent and easily understood, the present invention is further illustrated hereinafter by referring to the figures and the preferred embodiments.

Some illustrative drawings, quantity and materials as well as shapes of the components, and relative relationship among the components and etc. are briefly disclosed above merely by showing some illustrative embodiments; however, the protection scope of the present invention is not limited hereto.

Embodiments

Illustrative embodiments of the present invention will be elaborated below by reference to the drawings, wherein the same reference numbers throughout the description indicate identical or similar components. However, this disclosure may have various different embodiments and the following disclosure is not limited to the embodiments elaborated herein. On the contrary, these embodiments and a comprehensive and thorough elaboration of the disclosure is provided to help those skilled in the art fully understand concepts of the present invention.

Figure 1:
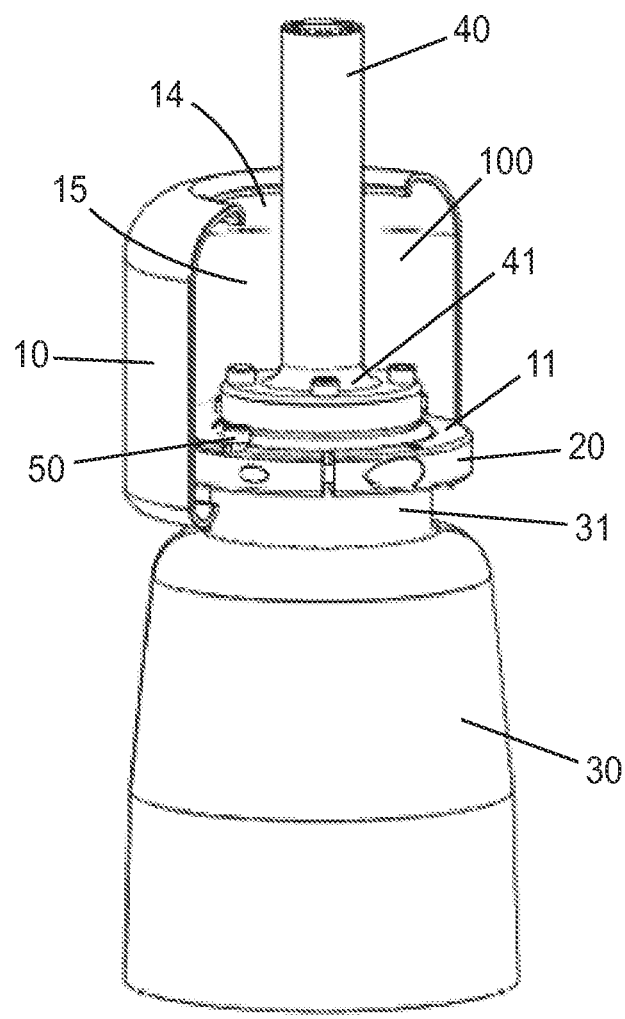
FIG. 1 is an illustrative installation drawing of the corona-free cap assembly according to a preferred embodiment of the present invention, in which the corona-free cap is sectioned to show the structure inside the grading chamber.
Figure 2:
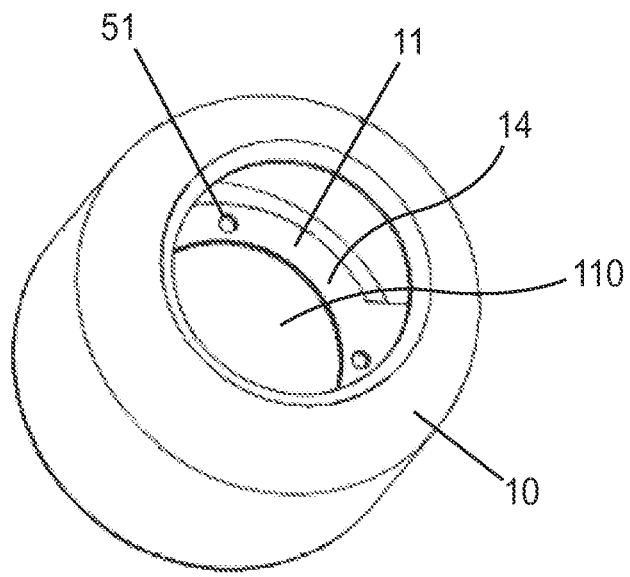
FIG. 2 is an illustrative drawing of the corona-free cap in the corona-free cap assembly according to the above-described preferred embodiment of the present invention.
Figure 3:
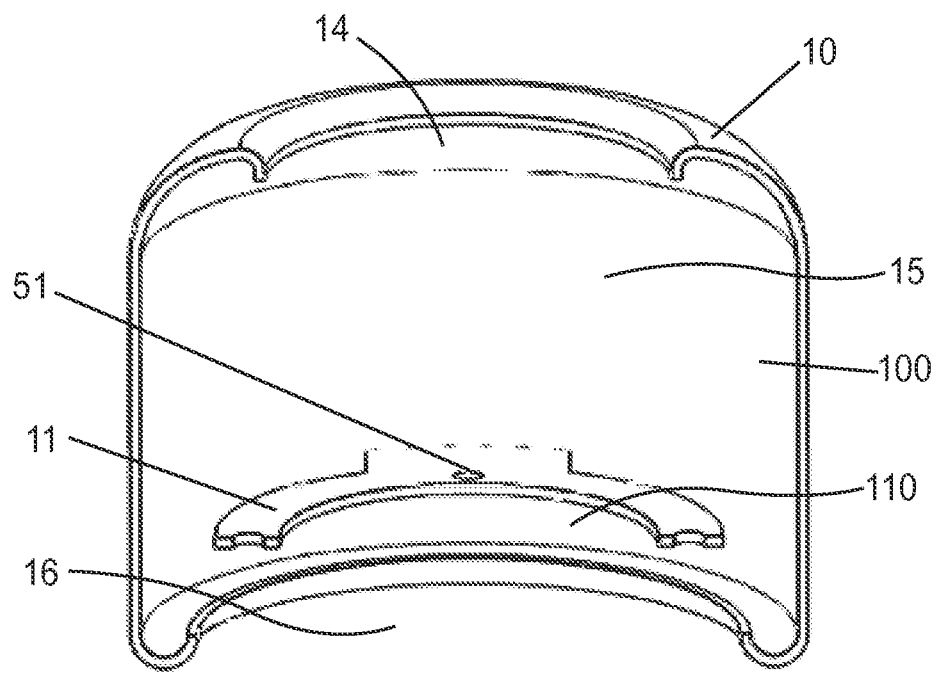
FIG. 3 is another illustrative drawing of the corona-free cap in the corona-free cap assembly according to the above-described preferred embodiment of the present invention, in which the corona-free cap is sectioned.

As shown in FIGS. 1-7, the present invention provides a corona-free cap assembly. The corona-free cap assembly is used for achieving uniform electrical stress distribution around the electrical device 30 having a cylindrical end 31. Particularly, the corona-free cap assembly mainly comprises a clamping member 20 and a corona-free cap 10. The clamping member 20 is configured to clamp the cylindrical end 31 along the circumferential direction of the cylindrical end 31. The corona-free cap 10 comprises a grading chamber 15 having two open ends 14 and 16; meanwhile, the corona-free cap 10 also comprises a connection component 11. The connection component 11 is fixed inside the grading chamber 15 and is connected with the clamping member 20 so that the corona-free cap 10 is detachably fixed on the electrical device 30 and the cylindrical end 31 of the electrical device 30 is at least partially extended into the grading chamber 15 of the corona-free cap 10 through one end 16 of the open ends 14 and 16. It should be noted that, as shown in FIGS. 1-3, the grading chamber 15 may alternatively be a hollow truncated cone having a certain gradient, and the hollow truncated cone has an open end 14 with a smaller diameter and an open end 16 with a larger diameter. The open end 14 is used for an external device such as a terminal 40 to pass through, while the open end 16 is used for the cylindrical end 31 of the electrical device 30 to at least partially extend into the grading chamber 15. Of course, in other embodiments, the grading chamber 15 may also be a hollow object having other shapes (e.g., a cylinder).

Furthermore as shown in FIGS. 2 and 3, a connection component 11 is formed inside the grading chamber 15 of the corona-free cap 10. Inside the grading chamber 15, a through opening 110 is formed on the connection component 11, and the through opening 110 is adapted for the cylindrical end 31 of the electrical device 30 to pass through. It should be noted that main function of the connection component 11 of the corona-free cap 10 is to provide a connection interface between the corona-free cap and other components (such as the clamping member 20 of the present invention). In an embodiment as shown in FIGS. 2 and 3, the connection component 11 comprises at least one substantially ring-shaped portion, i.e., an annulus, fixed on the inner surface 100 of the grading chamber 15 along the circumferential direction of the grading chamber 15. However, in other embodiments, the connection component 11 may also be at least two circular arc parts (not shown in the figures) fixed on the inner surface 100 of the grading chamber 15 along the circumferential direction of the grading chamber 15, wherein the cylindrical end 31 of the electrical device 30 can pass through a central area defined by the at least two circular arc parts.

Figure 4:
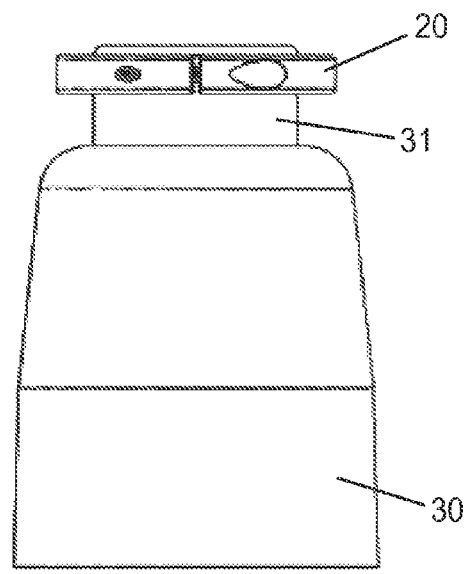
FIG. 4 is an illustrative drawing of the clamping ring in the corona-free cap assembly, when clamped on the cylindrical end of an electrical device according to the above-described preferred embodiment of the present invention.

In another corona-free cap assembly provided in the present invention, one of its main features is that it provides an independent clamping member 20, as shown in FIG. 4. The clamping member 20 is installed on periphery of the cylindrical end 31 of the electrical device 30, and is adapted for clamping the cylindrical end 31 along the circumferential direction of the cylindrical end 31.

Figure 5:
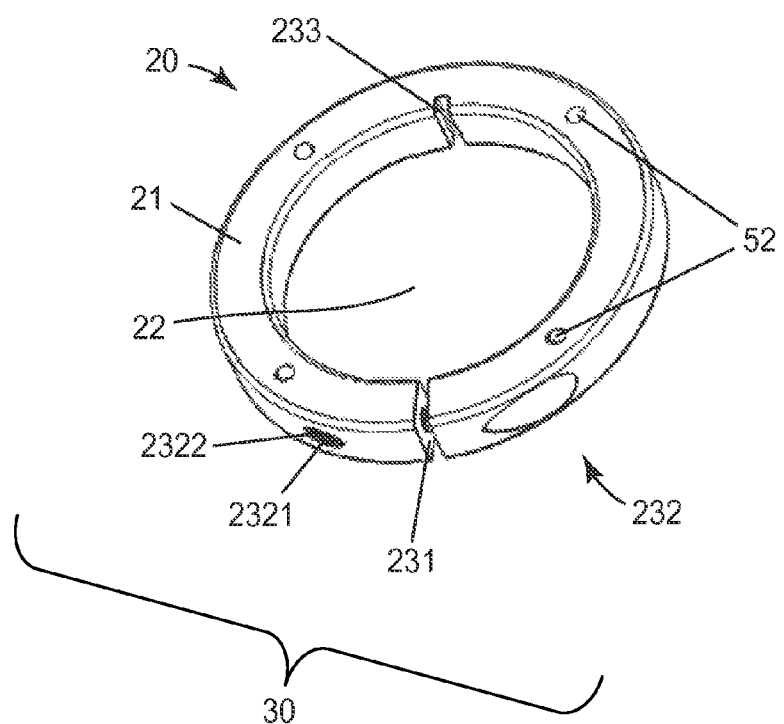
FIG. 5 is an illustrative drawing of the clamping ring in the corona-free cap assembly according to the above-described preferred embodiment of the present invention.
Figure 6:
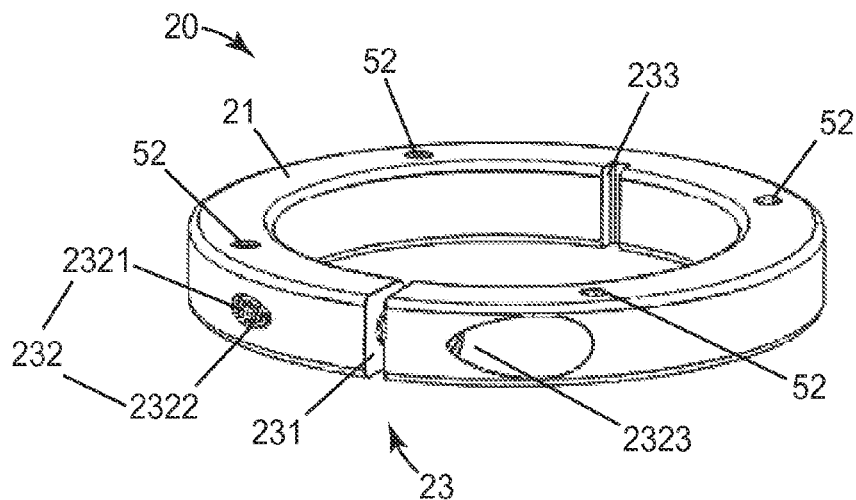
FIG. 6 is another illustrative drawing of the clamping ring in the corona-free cap assembly according to the above-described preferred embodiment of the present invention.

In an embodiment according to the present invention, as shown in FIG. 5, the clamping member 20 comprises a ring body 21, a through opening 22 formed by the ring body 21 around it, and a clamp force adjusting mechanism 23. The ring body 21 may be provided to clamp on periphery of the cylindrical end 31, while the clamp force adjusting mechanism 23 is adapted for tightening/releasing the ring body 21 clamping on the cylindrical end 31. In this embodiment, the clamp force adjusting mechanism 23 comprises a gap 231 and an adjusting means 232. As shown in FIGS. 5 and 6, the gap 231 is formed on the ring body 21 so that the ring body 21 forms two ends, while the adjusting means 232 is provided to change size of the gap 231 for adjusting clamp force exerted on the cylindrical end 31 by the clamping member 20. Furthermore the adjusting means 232 comprises a threaded hole 2321, a non-threaded hole 2323 and a threaded fastener 2322. As shown in the figures, the threaded hole 2321 is laterally extended through one end of the ring body 21 adjacent to the gap 231, the non-threaded hole 2323 is located at another end of the ring body 21 adjacent to the gap 231, and the non-threaded hole 2323 and the threaded hole 2321 are designed to be coaxial; while the threaded fastener 2322 is provided to connect the non-threaded hole 2323 and the threaded hole 2321, and is engaged with the thread in the threaded hole 2321 for fastening. In this way, by engagement of the threaded hole 2321 with the threaded fastener 2322, the size of the gap 231 of the clamping member 20 can be adjusted, and the clamp force exerted on the cylindrical end 31 by the clamping member 20 can be adjusted accordingly.

Figure 7:
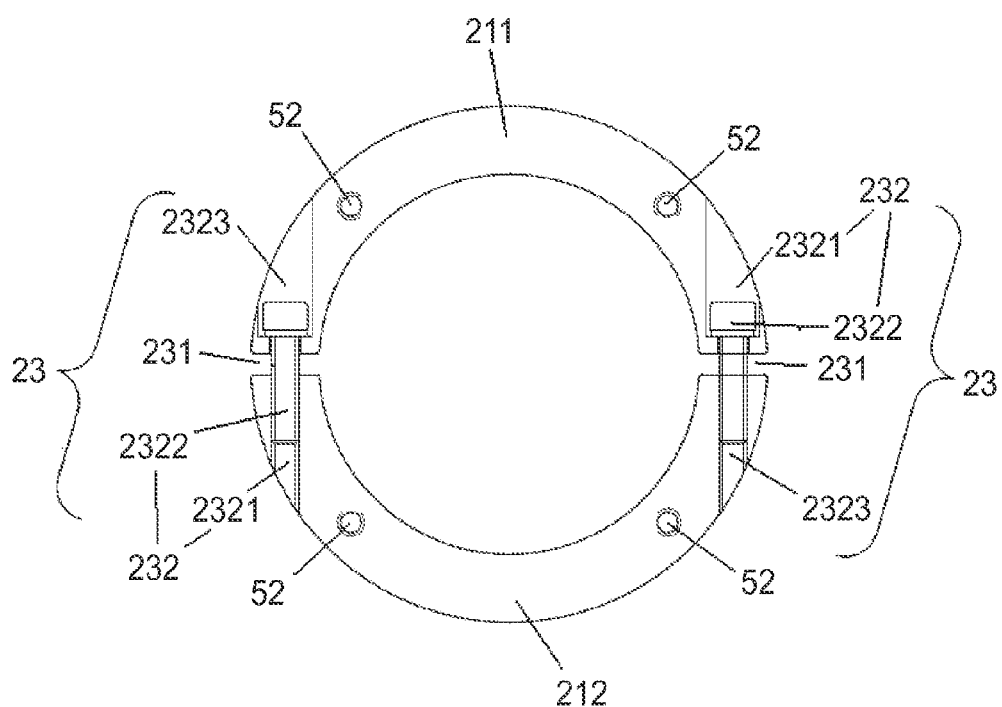
FIG. 7 is an illustrative drawing of the clamping ring in the corona-free cap assembly according to another preferred embodiment of the present invention.

Moreover, in another embodiment according to the present invention, as shown in FIG. 7, the clamping member 20 may also comprise a first and a second circular arc body 211 and 212 and two adjusting means 232. In the clamping member 20, each adjusting means 232 is adapted for connecting one end of the first circular arc body 211 and one end of the second circular arc body 212 together so that the clamping member 20 is clamped on the cylindrical end 31. Similarly, in the embodiment, each adjusting means 232 comprises a threaded hole 2321, a non-threaded hole 2323, and a threaded fastener 2322. In this embodiment, the threaded hole 2321 is extended through one end of both the first and the second circular arc body 211 and 212; and the non-threaded hole 2323 is extended through another end of both the first and the second circular arc body 211 and 212, and the non-threaded hole 2323 and threaded hole 2321 are designed to be coaxial; while the threaded fastener 2322 is provided to connect the non-threaded hole 2323 and the threaded hole 2321 so that corresponding ends of the first and the second circular arc body 211 and 212 are connected together. Thus, by engagement of the threaded hole 2321, non-threaded hole 2323 and the threaded fastener 2322, the size of the gap 231 of the clamping member 20 can be adjusted, and the clamp force of the clamping member 20 exerted on the cylindrical end 31 can be adjusted accordingly.

Preferably, the threaded hole 2321 extended through the gap 231 is provided coaxially in the two ends of the clamping member 20 at the gap 231 of the clamping member 20 in the radial direction, thus forming a threaded hole and a stepped bore hole respectively at the two ends, and the diameter of the stepped bore hole farther away from the gap 231 is relatively larger.

Furthermore according to the present invention, the clamping member 20 further comprises a stress adjusting mechanism for adjusting stress of itself while generating a clamp force on the cylindrical end 31. Particularly, in an embodiment according to the present invention, as shown in FIG. 5, the stress adjusting mechanism of the clamping member 20 for adjusting stress of itself comprises one or more tension notch 233. One or more tension notches 233 are formed on the clamping member 20, and are adapted for releasing tension of the clamping member 20 when the clamping member 20 clamps on the cylindrical end 31 of the electrical device 30. Preferably, the one or more tension notches 233 are provided along the axial direction of the clamping member 20, and are open to internal circular surface of the clamping member 20 only in the radial direction of the clamping member 20, but not open to the external surface. Preferably, the one or more tension notches 233 are evenly provided on the ring body 21 of the clamping member 20 except the gap 231.

It should be noted that the clamping member 20 provided by the present invention is preferably made of a material having a certain degree of flexibility.

Furthermore, in the corona-free cap assembly provided by the present invention, the connection component 11 further comprises a plurality of first connection holes 51, while the clamping member 20 comprises a plurality of second connection holes 52. The plurality of the first connection holes 51 formed on the connection component 11 is aligned with the plurality of the second connection holes 52 formed on the clamping member 20 respectively. Moreover, a plurality of fasteners 50 is provided. The plurality of the fasteners 50 is provided to fasten the first connection holes 51 and the second connection holes 52 together respectively, thus achieving connection between the clamping member 20 and the corona-free cap 10.

Illustratively, in the above-described corona-free cap assembly, the electrical device 30 may comprise an electrical cable partially covered by an insulator, while the cylindrical end 31 is an armature head of the insulator, wherein the armature head is adapted to electrically connect the electrical cable to an external electrical device.

According to another aspect of the present invention, the present invention accordingly provides a cable terminal assembly. The cable terminal assembly comprises an electrical cable; an insulator 30 having a cylindrical end 31, wherein the insulator 30 is adapted to cover at least a portion of the electrical cable; and the aforementioned corona-free cap assembly, wherein the corona-free cap assembly is adapted to be detachably fixed on the insulator 30 and to achieve uniform electrical stress distribution around the insulator 30.

An illustrative example of practical application of the corona-free cap assembly provided by the present invention is provided below.

A design of the corona-free cap 10 and clamping member 20:

In an embodiment according to the present invention, as shown in FIGS. 1-4, the corona-free cap 10 is a cylindrical structure, and open ends 14, 16 are formed respectively on two ends of the cylindrical corona-free cap 10. Inner diameters of the open ends are smaller than the largest outer diameter the cylindrical corona-free cap 10. Both ends of the cylindrical corona-free cap 10 are shaped in smooth circular arc transition between the maximal outer diameter and the smallest inner diameter of the cylindrical corona-free cap 10. The level corresponding to the smallest inner diameter at both ends of the cylindrical corona-free cap 10 is lower than the highest level of the circular arc transition at both ends of the cylindrical corona-free cap 10. Moreover, a connection interface (i.e., a connection component) 11 of the corona-free cap 10 is integrated with the corona-free cap 10, and a through opening 110 is provided in the center of the connection interface (the connection component) 11, and the inner diameter of the through opening 110 is larger than the outer diameter of the conductive panel (i.e., cylindrical end) 31 on the epoxy insulator (i.e., the electrical device) 30. The inner diameter of the through opening 110 of the connection interface (i.e., the connection component) 11 is larger than the largest outer diameter of the conductive panel (i.e., the cylindrical end) 31 on the epoxy insulator (i.e., the electrical device) 30.

As shown in FIGS. 1 and 5-6, the clamping member 20 is a ring-shaped structure, and the clamping member 20 is adapted for clamping on the conductive panel (i.e., cylindrical end) 31 on the epoxy insulator (i.e., electrical device) 30 to fix the cylindrical corona-free cap 10 and to achieve electrical conduction between the corona-free cap 10 and the conductive panel 31 on the epoxy insulator 30.

A gap 231 is formed on the ring-shaped clamping member 20, and a completely through tension notch 233 is formed along axial direction in a position opposite to the gap 231 along the diameter of the clamping member 20. The tension notch 233 is provided to allow the ring-shaped clamping member 20 to have a certain degree of flexibility and compressibility in radial direction, i.e., to allow the diameter of the ring-shaped clamping member 20 to be variable, so that the ring-shaped clamping member 20 can be completely fixed on any conductive panel 31 that meets requirement of outer diameter. The largest diameter of the inner through opening 22 of the ring-shaped clamping member 20 should be larger than the largest outer diameter of the conductive panel 31. A threaded hole 2321 is formed on both sides of the gap 231 of the ring-shaped clamping member 20, or alternatively, a threaded hole is formed on one side, and a non-threaded hole is formed on the other side, for achieving connection of the clamping member 20 at the gap 231, and for achieving clamping connection between the clamping member 20 and the conductive panel 31 by adjusting engagement between the threaded hole 2321 and the threaded fastener 2322.

It can be seen from the above that the present invention provides a novel corona-free cap assembly for a cable terminal of a transformer. The corona-free cap assembly mainly comprises a corona-free cap having a connection component (connection interface) and a clamping member. Particularly, a completely new connection manner is adopted for the corona-free cap assembly, namely, fixing the clamping member first on periphery of the cylindrical end (e.g., a conductive panel) of the electrical device (e.g., an insulator), and then fastening the connection component (the connection interface) and the clamping member together with a fastening mechanism, so that the corona-free cap is fixed on the clamping member. A bolt hole on the cylindrical end (e.g., a conductive panel) of the electrical device (e.g., an insulator) will be used to connect with the terminal. Therefore, the corona-free cap assembly provided by the present invention allows the corona-free cap to be fixed on periphery of the cylindrical end (e.g., a conductive panel) of the electrical device (e.g., an insulator) by using an independent clamping member. In this way, the bolt hole on the cylindrical end (e.g., a conductive panel) for connecting with the terminal will not be used when achieving connection of the corona-free cap with the cylindrical end (e.g., a conductive panel) of the electrical device (e.g., an insulator). Thus, the electrical connection with the transformer terminal products can be readily achieved without dismantling the corona-free cap no matter how the terminal is connected.

Although merely several illustrative embodiments have been shown and described above, those skilled in the art should understand that any modifications and improvement on these illustrative embodiments of the present invention without departing from the spirit and scope of the present invention shall fall within the scope of the present invention. The protection scope of the claims of the present invention should be as defined in the claims of this application and their equivalents.

What is claimed is:

1. A corona free cap assembly to provide a uniform electric stress distribution around an electrical device (30) comprising:
    a clamping member for clamping on a cylindrical end of the electrical device along the circumferential direction thereof; and
    a corona free cap having a grading chamber with two open ends, the corona free cap further having a connection component fixed within the grading chamber and adapted for connection with the clamping member wherein the corona free cap is detachably fixed on the cylindrical end of the electrical device via the clamping member to aim for the uniform electric stress distribution around the electrical device and wherein the cylindrical end is at least partly extended into the grading chamber of the corona free cap through one of the open ends.

2. The corona free cap assembly according to claim 1, wherein a through opening is formed on said connection component and is adapted for passing the cylindrical end of the electrical device therethrough.

3. The corona free cap assembly according to claim 1, wherein said connection component has at least a substantially ring shape portion fixed on the inner surface of said grading chamber along the circumferential direction of said grading chamber.

4. The corona free cap assembly according to claim 1, wherein said connection component comprises at least two circular arc parts fixed on the inner surface of said grading chamber along the circumferential direction of said grading chamber.

5. The corona free cap assembly according to claim 1, wherein said clamping member comprises a ring body and a clamp force adjusting mechanism, said clamp force adjusting mechanism is adapted for tightening/releasing the ring body clamped on said cylindrical end, and said clamp force adjusting mechanism comprises:
    a gap, said gap being provided on said ring body to form two ends;
    an adjusting means, said adjusting means being provided to change said gap size for adjusting said clamp force exerted by said clamping member on said cylindrical end.

6. The corona free cap assembly according to claim 5, wherein said adjusting means comprises:
    a threaded hole, said threaded hole being located at one end of said ring body; and
    a non-threaded hole, said non-threaded hole being located at another end of said ring body, and said non-threaded hole and said threaded hole being designed to be coaxial; and
    a threaded fastener, said threaded fastener being provided to connect said non-threaded hole with said threaded hole.

7. The corona free cap assembly according to claim 1, wherein said clamping member comprises a first and a second circular arc body and two adjusting means, each adjusting means being adapted for connecting one end of said first circular arc body and one end of said second circular arc body together so that said clamping member is clamped on said cylindrical end.

8. The corona free cap assembly according to claim 7, wherein each adjusting means comprises:
    a threaded hole, said threaded hole being extended through one end of both said first and said second circular arc body; and
    a non-threaded hole, said non-threaded hole being extended through another end of both said first and said second circular arc body, and said non-threaded hole and said threaded hole being designed to be coaxial; and
    a threaded fastener, said threaded fastener being provided to connect said non-threaded hole with said threaded hole so that corresponding ends of said first and said second circular arc body are connected together.

9. The corona free cap assembly according to claim 5 or 7, wherein said clamping member further comprises:
    one or more tension notches formed on said clamping member, and, adapted for releasing tension force of said clamping member during the clamping of said clamping member onto the cylindrical end of the electrical device.

10. The corona free cap assembly according to claim 1, wherein said connection component comprises:
    a plurality of first connection holes formed on thereon and adapted for being matched to a plurality of second connection holes formed on said clamping member respectively, and
    a plurality of fasteners provided to fasten the first and corresponding second connection holes together.

11. A corona free cap assembly according to claim 1, wherein said electrical device comprises an electrical cable partly covered by an insulator and the cylindrical end is a head armature of the insulator, wherein the cylindrical end is adapted to electrically connect the electrical cable with an external electrical device.

* * * * *

UNITED STATES PATENT AND TRADEMARK OFFICE
CERTIFICATE OF CORRECTION

PATENT NO.        : 9,502,160 B2
APPLICATION NO.   : 14/405482
DATED             : November 22, 2016
INVENTOR(S)       : Simon Huang Page 1 of 1

It is certified that error appears in the above-identified patent and that said Letters Patent is hereby corrected as shown below:

In the Claims

<u>Column 9</u>
Line 22, In Claim 1, after "device" delete "(30)".

Signed and Sealed this
Twenty-third Day of May, 2017

Michelle K. Lee
*Director of the United States Patent and Trademark Office*